July 17, 1934.  J. D. STITES  1,966,835

FASTENING MEANS

Filed Jan. 28, 1932

Inventor
JOSEPH D. STITES

By *Davis & Davis*

Attorneys

Patented July 17, 1934

1,966,835

UNITED STATES PATENT OFFICE 1,966,835

FASTENING MEANS

Joseph D. Stites, Plainfield, N. J., assignor to Dardelet Threadlock Corporation, New York, N. Y., a corporation of Delaware Application January 28, 1932, Serial No. 589,387

2 Claims. (Cl. 85—1)

Important objects of the present invention are, to provide an improved fastening device having the desirable characteristics of both a bolt and a rivet, and to provide an improved tight-holding, releasable fastening means designed for satisfactorily joining structural steel parts and the like.

Other objects of the invention will appear hereinafter.

Figure 1:
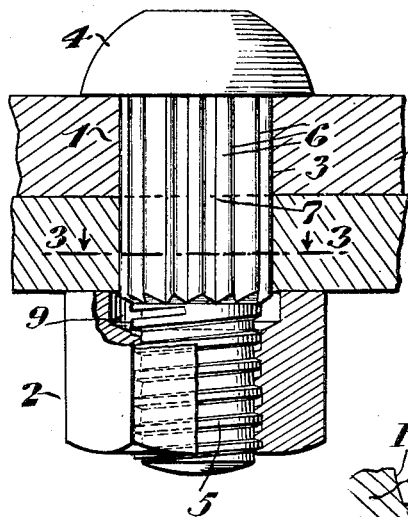
Figure 4:
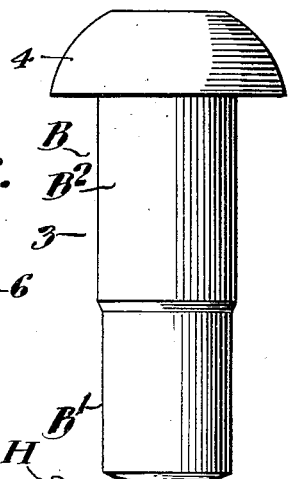
Figure 5:
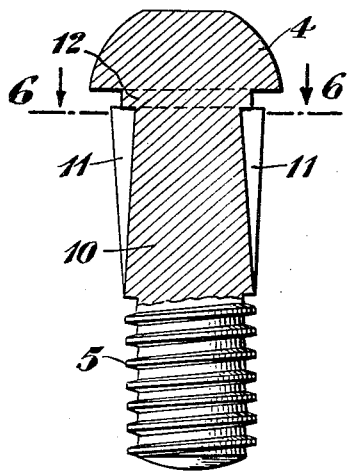

In the drawing Fig. 1 is a sectional side elevation of one form of the improved fastening device, showing it applied;

Fig. 2 a cross-sectional view of the ribbed portion of the bolt shank;

Fig. 3 an enlarged fragmentary cross section taken on the line 3—3 of Fig. 1;

Fig. 4 a side elevation of the blank from which the bolt member of the device is formed;

Fig. 5 a sectional side elevation of a modified form of the bolt member; and

Figure 6:
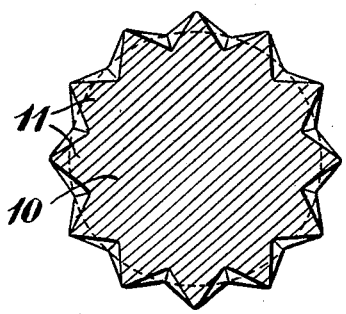

Fig. 6 an enlarged cross section taken on the line 6—6 of Fig. 4.

Referring to the form of the invention shown in Figs. 1, 2 and 3, the fastening means includes a bolt 1 and a nut 2. The bolt comprises a shank 3 having a rounded head 4 at one end and a thread 5 at its opposite end. Between the head and the thread the shank is serrated to form slender longitudinal ribs 6 and intervening grooves 7. Said ribs and grooves are approximately V-shaped in cross section and they preferably extend from the abutment face of the head to a point at or closely adjacent the inner end of the thread. Preferably the serrated and threaded bolt shank is formed from a blank B having a cylindrical end portion B' on which the threads are formed and a cylindrical portion B² extending from the portion B' to the bolt head and of slightly greater diameter than the portion B'. The serrations are formed upon the portion B², preferably by a cold rolling process which, in forming the grooves 7, transversely extrudes the metal of the blank to form the crests of the ribs 6. Said extruded crests protrude radially beyond the original radius of the blank portion B', preferably about three sixty-fourths of an inch. Preferably the groove bottoms are depressed radially nearer the shank axis than the periphery of the portion B' of the blank, or the crest of the thread 5, as indicated in Fig. 2. The serrations extend entirely around the circumference of the bolt and the longitudinal lines of their crests and groove bottoms are parallel with the bolt axis. The crests and groove bottoms may be slightly blunt in cross-section, as shown. The thread of the bolt and the thread of the nut are complementary threads of equal and constant pitch and are of the well-known Dardelet type of screw thread disclosed in United States Patent No. 1,657,244. The crest of the nut thread and the root of the bolt thread slope inward and make an angle of preferably six degrees with the thread axis, this being within the angle of friction of the metal or metals of the threads. The ribs of the threads are much narrower than the grooves to permit relative crosswise displacement of the threads in an axial direction for self-locking mutual engagement of said sloping crest and root locking surfaces. The threads also have opposed, coacting abutment surfaces making an abrupt angle to the axis to positively limit said crosswise displacement.

At its abutment face the nut has a recess in the form of a counterbore 9 having a diameter exceeding the maximum diameter of the threads and also slightly exceeding the maximum diameter of the serrated portion of the bolt. The height of the nut substantially corresponds to the length of the threaded portion of the bolt, and the depth of the counterbore exceeds the axial distance between the adjacent end of the serrated portion of the bolt and the point where the bolt thread 5 begins to run out and become imperfect. The purpose of the counterbore is to permit the nut to be screwed fully against an abutment without obstruction by the ribs and by the imperfect inner end portion of the thread.

For joining structural steel parts the bolt and nut are preferably made of an alloy steel having great tensile strength. A commercial steel containing manganese has been found to be well suited for the purpose. Such a steel is well adapted for cold working.

In applying the fastening means the threaded end of the bolt is inserted as far as it will freely go through registering apertures of slightly greater diameter than said threaded end but of less diameter than the serrated portion of the bolt. Then, by impact or pressure upon the head, the shank is forcibly driven fully into place. As the ribbed portion of the shank is driven home the crests of the ribs cut grooves in each hole H as indicated in Fig. 3, and the metal of the joined parts P is extruded to substantially fill the grooves 7 between the ribs owing to the fact that the structural steel parts are less hard than the bolt. The bolt is so proportioned with relation to the height of the nut and the thickness of the parts to be joined that the ribbed portion of the bolt has a length equal to or exceeding the depth of both of the registering holes and as the ribbed portion is of uniform cross section it will fill both holes. The nut 2 is screwed upon the bolt thread and forcibly tightened to draw the parts firmly together. When the axial advance of the nut is arrested and the nut is further turned without axial advance its thread is axially displaced crosswise outward of the bolt thread and the sloping crest surface of the nut thread is jammed into self-locking frictional engagement with the inclined root surface of the bolt thread. The shank of the bolt is splined and bound in the holes and positively resists the torque of screwing on and locking the nut so that there is no necessity of holding the bolt head against turning.

The bolt, the nut and the joined parts are bound together in a rigid unified joint structure in a manner to offer powerful resistance to any relative movement between them in any direction. Throughout the entire depth of the registering apertures there is a transverse bolt-work pressure which positively resists transverse relative displacement between the joined work pieces and also resists transverse relative displacement between the work pieces and the bolt. There is also a nut-work pressure longitudinally of the bolt which holds the work pieces clamped together. The nut-work pressure is positively maintained by the nut-locking feature, and by said positive holding of the work pieces and the bolt against any transverse movement relatively to the nut. Thereby all movement tending to unscrew the nut is eliminated and the nut is positively held against loosening due to vibration or work movement. All parts of the joint are rigidly bound together to vibrate in unison as though they were integrally formed.

The fastening device can be used in place of a hot driven rivet and it has many advantages thereover. It makes a stronger joint, reduces the labor of making the joint, avoids the objectionable noise of rivet driving and renders the joint releasable by unscrewing the nut and driving out the bolt. Since the bolt is cold driven it is possible to employ steel of much greater strength than is practicable for hot driven rivets. It is also possible to obtain a much greater compression of the joined parts by tightening the nut 2 than is obtainable by a rivet which produces compression solely by its cooling and contraction. Also, the longitudinal contraction of the rivet weakens it and the transverse contraction reduces its diameter and leaves a slight space in the holes. The cold driven bolt constantly fills the holes and owing to this fact together with the greatly increased compression obtainable by the nut and by the employment of steel of much greater tensile strength than is practicable in the case of rivets, the joined parts are powerfully clamped together to resist slippage and reduce the shearing strain upon the fastening means.

In structural steel riveting it is customary to first produce the required compression of the joined parts by bolting them together through the rivet holes. Then, the bolts are removed one by one and replaced by hot driven rivets. The present invention eliminates the necessity of this preliminary bolting together of the parts. The improved cold-driven bolt may be inserted at the start by a single, unassisted workman and by the employment of only a hand hammer and a wrench. Much labor is thereby eliminated.

Another advantage of the bolt is its accommodation to "drift" of the holes, that is, a slight lateral displacement of the holes out of accurate register. If the reduced, threaded end of the bolt is insertable through the holes the ribbed portion of the bolt may be driven into place, the rib crests penetrating the walls of the holes to a greater or less degree in accordance with the drift. This avoids the necessity of bringing the holes into register by means of a drift pin or by reaming them to receive an oversize fastening element.

While the bolt has been described as preferably made of harder or stronger metal than the joined parts it may, for some services, be made of a metal which will permit the bolt ribs to upset laterally in the bolt holes to a greater or less degree. In either case it will be obvious that the ribbed bolt will fill the holes, prevent lateral clearance and play and bind the bolt against turning when the nut is tightened. Also, while the fastening device in the present disclosure embodies the Dardelet thread-locking feature, other nut-locking means may be employed.

Figs. 5 and 6 show a modification of the bolt. This bolt, designated 10, is formed from a blank of uniform diameter and the form of its serrations is varied from that previously described. Otherwise it is similar in form to the bolt 1. The ribs 11 of the bolt 10 terminate at a point spaced slightly inward from the head of the bolt to leave a neck portion 12. Adjacent the bolt head, the rib crests protrude radially and lie in a circle having a diameter greater than the maximum diameter of the thread 5, and the groove bottoms between the ribs are spaced inward to a degree corresponding to the outward spacing of the rib crests. From their protruding ends the rib crests converge or taper longitudinally inward toward the thread axis and the groove bottoms diverge from the axis. Adjacent the threaded portion of the bolt shank, the crests and groove bottoms are approximately the same distance from the shank axis as the crest of the thread. The serrations are preferably formed by a cold rolling process which transversely extrudes the shank metal to form the ribs which project radially beyond the original periphery of the blank shank to form the grooves whose bottoms are depressed to a corresponding degree within said periphery. The serrated portion of the shank has a uniform cross-sectional area corresponding to that of the blank.

The bolt 10 may also be made of very strong steel as in the case of bolt 1 but preferably it is made of softer metal which will permit the ribs to upset transversely. As the ribbed portion of the bolt is driven home through registering holes in metal parts to be joined the ribs will cut slight grooves in the walls of the holes and then the metal of the rib crests will be transversely upset into the intervening grooves. If any of the rib metal is extruded or sheared off toward the head it may be received in the space surrounding the neck 12. A nut similar to the nut 2 may be screwed upon the bolt thread 5, the bolt being self-bound against rotation in the holes to resist the torque of self-locking tightening rotation of the nut.

What I claim is:

1. A separable fastener comprising, in combination, a bolt whose shank has a head and a reduced screw threaded end portion at opposite ends of a non-threaded shank portion the periphery of which is longitudinally corrugated from the inner end of said threaded end portion at least substantially to said head, and a nut for said bolt whose height is substantially equal to the length of said threaded end portion of the bolt shank and whose bore is screw threaded for a portion only of its length for coupling the nut with the threaded end portion of the bolt shank and is also enlarged at one end in the base portion of the nut to a diameter which is at least as great as the maximum diameter of the corrugated periphery of said non-threaded portion of the bolt shank.

2. A separable fastener comprising, in combination, a bolt having a head from which extends a round shank whose outer end portion is screw threaded and whose periphery is both longitudinally corrugated and of greatest maximum diameter from the inner end of said threaded end portion substantially to said bolt head, and a nut for said bolt whose height substantially corresponds with the length of the threaded end portion of the bolt shank and which is screw threaded for coupling with said threaded end portion of the shank and has a hollow non-threaded base portion for rotatively encompassing the corrugated periphery of the bolt shank.

JOSEPH D. STITES.